United States Patent [19]

Bancroft

[11] Patent Number: 5,548,511
[45] Date of Patent: Aug. 20, 1996

[54] METHOD FOR CONTROLLING SELF-RUNNING CLEANING APPARATUS

[75] Inventor: Allen J. Bancroft, Elkhart, Ind.

[73] Assignee: White Consolidated Industries, Inc., Cleveland, Ohio

[21] Appl. No.: 968,290

[22] Filed: Oct. 29, 1992

[51] Int. Cl.$^6$ ..................................................... G06F 7/70
[52] U.S. Cl. ............................... 364/424.02; 364/424.01; 318/587; 318/568.12; 15/319; 15/340.1; 180/169; 180/167
[58] Field of Search .......................... 364/424.02, 424.01; 180/169, 167, 79.1; 15/319, 340.1, 52.1; 901/1, 47, 46; 318/587, 640, 568.12

[56] References Cited

U.S. PATENT DOCUMENTS

| | | | |
|---|---|---|---|
| 3,713,505 | 1/1973 | Muller | 180/79.1 |
| 3,744,586 | 7/1973 | Leinauer | 180/79.1 |
| 4,658,385 | 4/1987 | Tsuji | 367/105 |
| 4,674,048 | 6/1987 | Okumura | 364/424 |
| 4,700,427 | 10/1987 | Knepper | 15/319 |
| 4,703,240 | 10/1987 | Yoshimoto et al. | 318/587 |
| 4,811,229 | 3/1989 | Wilson | 364/424.02 |
| 4,817,000 | 3/1989 | Eberhardt | 364/443 |
| 4,860,209 | 8/1989 | Sugimoto et al. | 364/424.02 |
| 4,905,151 | 2/1990 | Weiman et al. | 364/424.02 |
| 4,947,324 | 8/1990 | Kamimura et al. | 364/424.02 |
| 4,954,962 | 9/1990 | Evans, Jr. et al. | 364/513 |
| 4,967,064 | 10/1990 | Field et al. | 250/203.2 |
| 4,967,860 | 11/1990 | Kremser | 180/169 |
| 4,982,329 | 1/1991 | Tabata et al. | 364/424.02 |
| 5,032,775 | 7/1991 | Mizuno et al. | 318/587 |
| 5,076,384 | 12/1991 | Wada et al. | 180/169 |
| 5,107,946 | 4/1992 | Kamimura et al. | 180/169 |
| 5,109,566 | 5/1992 | Kobayashi et al. | 15/318 |

*Primary Examiner*—Kevin J. Teska
*Assistant Examiner*—Jacques H. Louis-Jacques
*Attorney, Agent, or Firm*—Pearne, Gordon, McCoy & Granger

[57] ABSTRACT

In a learning phase, a cleaning robot is started into an area to be cleaned. The robot measures and records the distances to left and right boundaries as it travels to determine the plan of the area. Using the measurements, it steers down the center of the area until it encounters a forward obstacle. It then determines a path for cleaning the area. In a cleaning phase, the robot follows the determined path.

6 Claims, 4 Drawing Sheets

METHOD FOR CONTROLLING SELF-RUNNING CLEANING APPARATUS

BACKGROUND OF THE INVENTION

This invention relates to a cleaning apparatus and, more particularly, to methods for the autonomous control of such an apparatus.

There is a great deal of current interest in autonomous cleaning devices or robots. With rising janitorial labor costs, increased computer processing power and dropping prices for sensors and electronic hardware, autonomous devices that once would have been too expensive or even impossible are now being created.

U.S. Pat. No. 5,109,566 shows such a self-running cleaning apparatus and is incorporated herein in its entirety by reference.

Most of these cleaning robots fall into two categories. Those in the first category require that an operator manually teach the robot the area that it is to clean. This is usually accomplished by the operator guiding the robot through at least a portion of the cleaning path before the robot is "turned loose."

The second category of robots start immediately cleaning on their own by using a very localized algorithm. The robot simply starts cleaning everything it can and keeps increasing the area cleaned until boundaries are reached.

The robot of the above-cited patent may be operated in either of these modes.

Both of these categories require too much operator attention. The first actually requires the operator to teach the robot the area to be cleaned and the second will often require an operator to monitor the robot to make sure it doesn't leave the desired area on its own. In addition, the second category may produce an inefficient cleaning pattern because of the localized focus of the algorithm.

SUMMARY OF THE INVENTION

The present invention avoids these problems by dividing the autonomous operation of the robot into two phases. The first phase quickly determines the area to be cleaned and a path for accomplishing the cleaning. The invention may or may not actually perform some cleaning during this phase. The second phase is then the actually cleaning of the area.

In this way no operator assistance is needed to train the robot and it is quickly determinable if the robot is going to stay in the desired area. In addition, because the area to be cleaned is known before the path is determined, efficient coverage of the area can be planned.

The method for guiding a self-propelled autonomous cleaning robot includes several steps. The robot is started in a learning phase by the robot moving in a forward direction into an area to be cleaned having a left and right side boundary.

The robot repeatedly senses a distance to the right boundary, a distance to the left boundary, and a distance travelled. These distances are stored in memory means. The direction of the robot is adjusted in response to the right and left boundary distances to maintain a desired distance from the left and right boundaries. The robot updates a plan of the area to be cleaned with the distances as it moves.

The following paragraph is repeated until an obstacle in the forward direction is detected by the robot. Then the robot computes a cleaning path that will completely traverse the plan.

Next, the robot performs a cleaning phase by following the cleaning path as sensed by said distance sensing means.

In the preferred embodiment, the plan of the area to be cleaned is determined in accordance with the mode of the right and left boundary distances. In addition, the boundary distances with values greater than a maximum distance are disregarded.

DESCRIPTION OF THE PREFERRED EMBODIMENT

Figure 1:
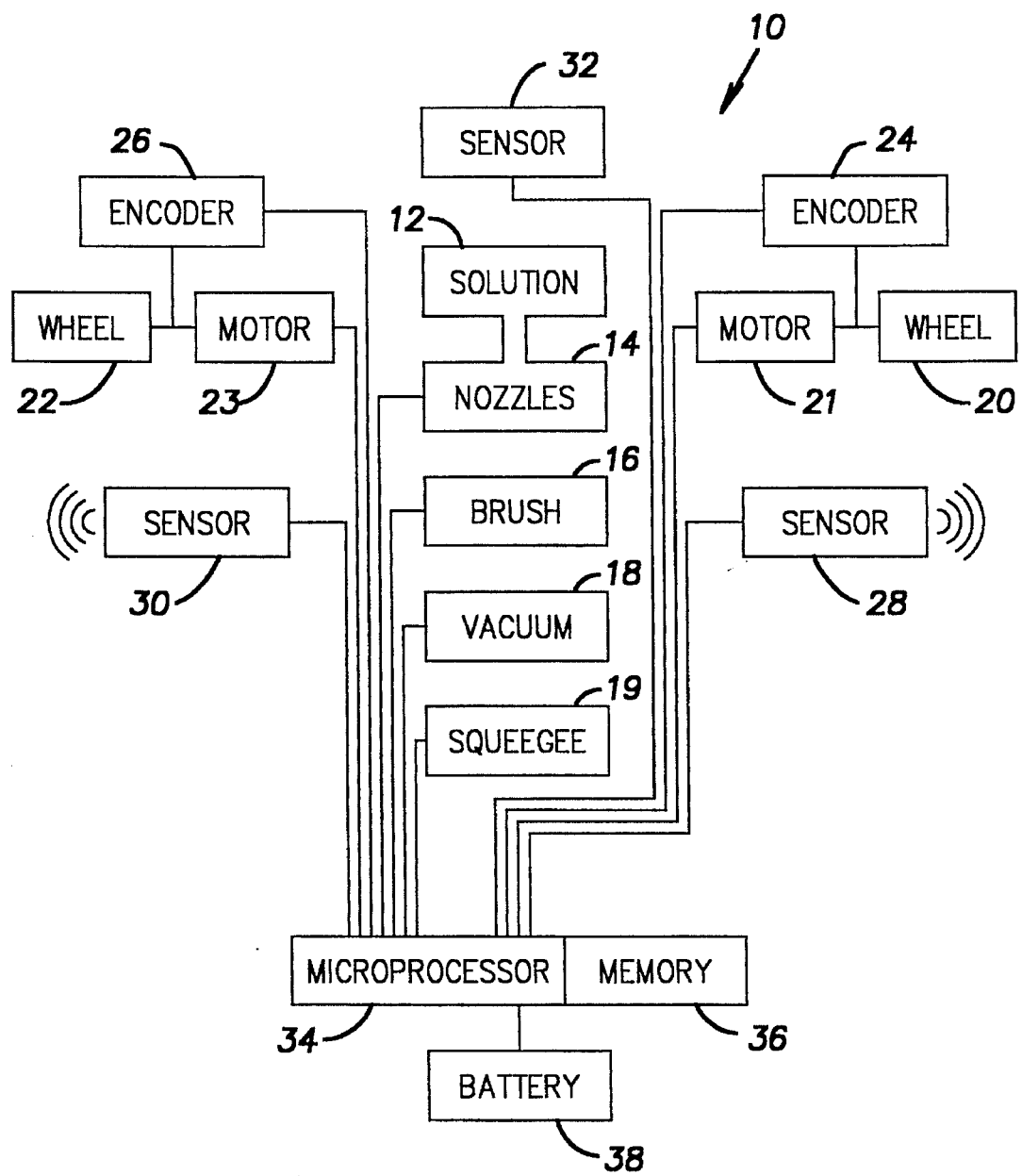
FIG. 1 is a block diagram of a robot according to the invention.

Referring to FIG. 1, a self-propelled autonomous cleaning robot 10 is provided with cleaning solutions 12, applicator nozzles 14, brush 16, vacuum 18 and squeegee 19 for cleaning floors.

The robot 10 is provided with a right drive wheel 20 driven by a motor 21 and a left drive wheel 22 driven by a motor 23. The wheels 20, 22 provide for movement and steering. Encoders 24, 26 for respective drive wheels 20, 22 provide digital indications of the amount of revolution of each drive wheel 20, 22. The encoders 24, 26 may be, for example, shaft encoders on either the wheels 20, 22 or some shaft intermediate thereto. Based on a known drive-wheel circumference, this revolution information provides a measure of the distance of travel of the robot 10, as well as maneuvering information. The robot 10 may move, for example, at a rate of 300–600 mm/sec.

A right distance sensor 28 measures distances from the robot 10 to a wall or boundary to the right of the robot 10. A left distance sensor 30 measures distances from the robot 10 to a wall or boundary to the left of the robot 10. The sensors 28, 30 may be, for example, ultrasonic sonar sensors or infrared sensors. Sonar sensors may have, for example, a range of 5 meters to either side of the robot 10.

A forward sensor 32 detects obstacles in front the robot 10. The sensor 32 may be, for example, a contact sensor, a sonar sensor or an infrared sensor.

The operation of the components of the robot 10 are controlled by a microprocessor 34 having associated memory 36. The distance sensors 28, 30 may provide, for example, distance information to the microprocessor 34 twice each second. The encoders 24, 26 provide distance travelled information to the microprocessor 34. The forward sensor 32 provides information to the microprocessor 34 on obstacles to the front of the robot 10.

Electric power for the robot 10 is provided by a battery 38.

Figure 2:
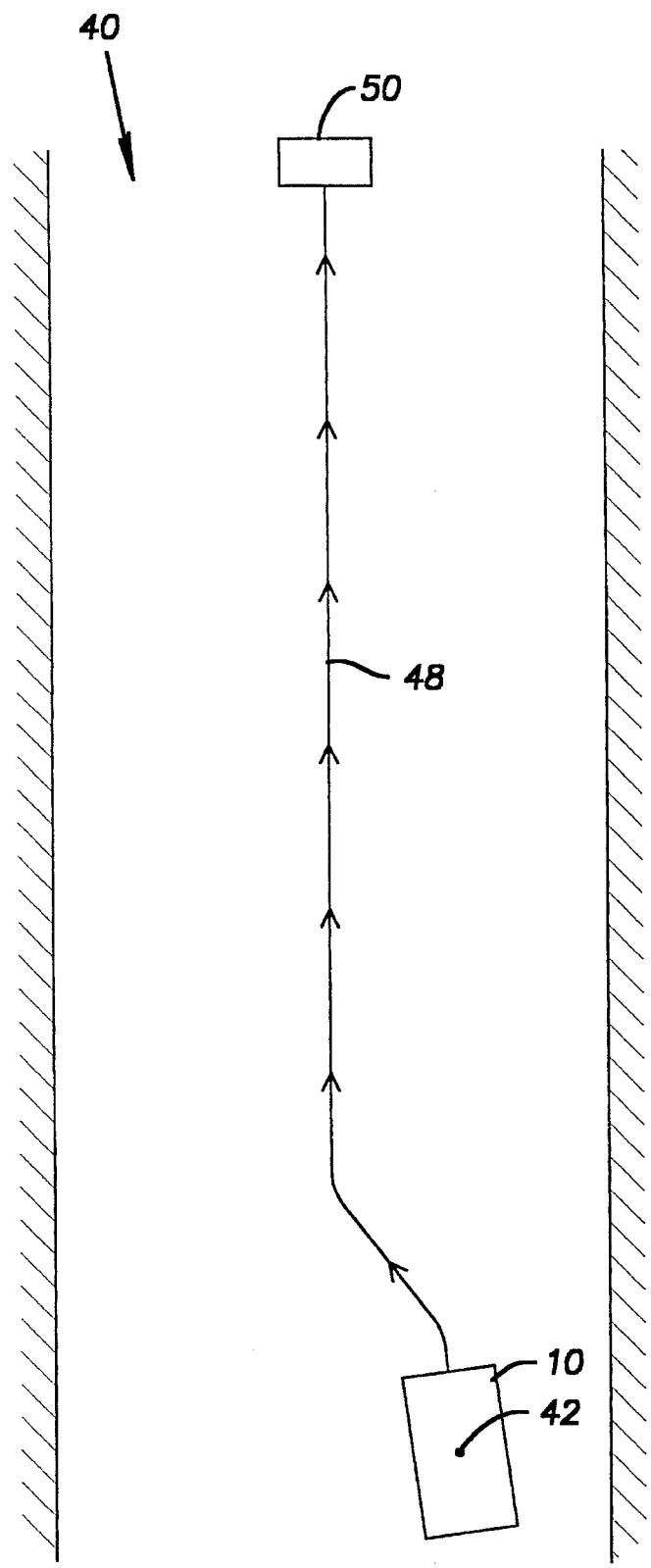
FIG. 2 is a plan view of an area to be cleaned showing an exemplary path of the robot during its learning phase.

The operation of the robot 10 occurs in two distinct phases. Referring to FIG. 2, the first of these is the learning phase where the robot 10 starts into a new area to be cleaned, for example, a long hallway. During this phase, the robot 10 determines the boundaries or plan of the area to be cleaned and the path it should follow to accomplish the cleaning.

To begin this phase, the robot 10 is started into the area 40 to be cleaned from an initial position 42. Based on distances provided by the sensors 28, 30, the robot 10 attempts to follow the centerline of the area 40 to be cleaned (if preferred, the robot 10 may be programmed to stay closer to either the right boundary 44 or the left boundary 46).

As the robot 10 follows the path 48, it stores the distances measured by the sensors 28, 30 in the memory 36. This continues until an obstacle 50 is detected by the forward sensor 32. The obstacle 50 may be, for example, a wall or a object purposely placed in front the robot 10 to indicate the end of the area 40 to be cleaned.

Based on the distance data from the distance sensors 28, 30 and the encoders 24, 26, the robot 10 determines the dimensions of the area 40.

Figure 3:
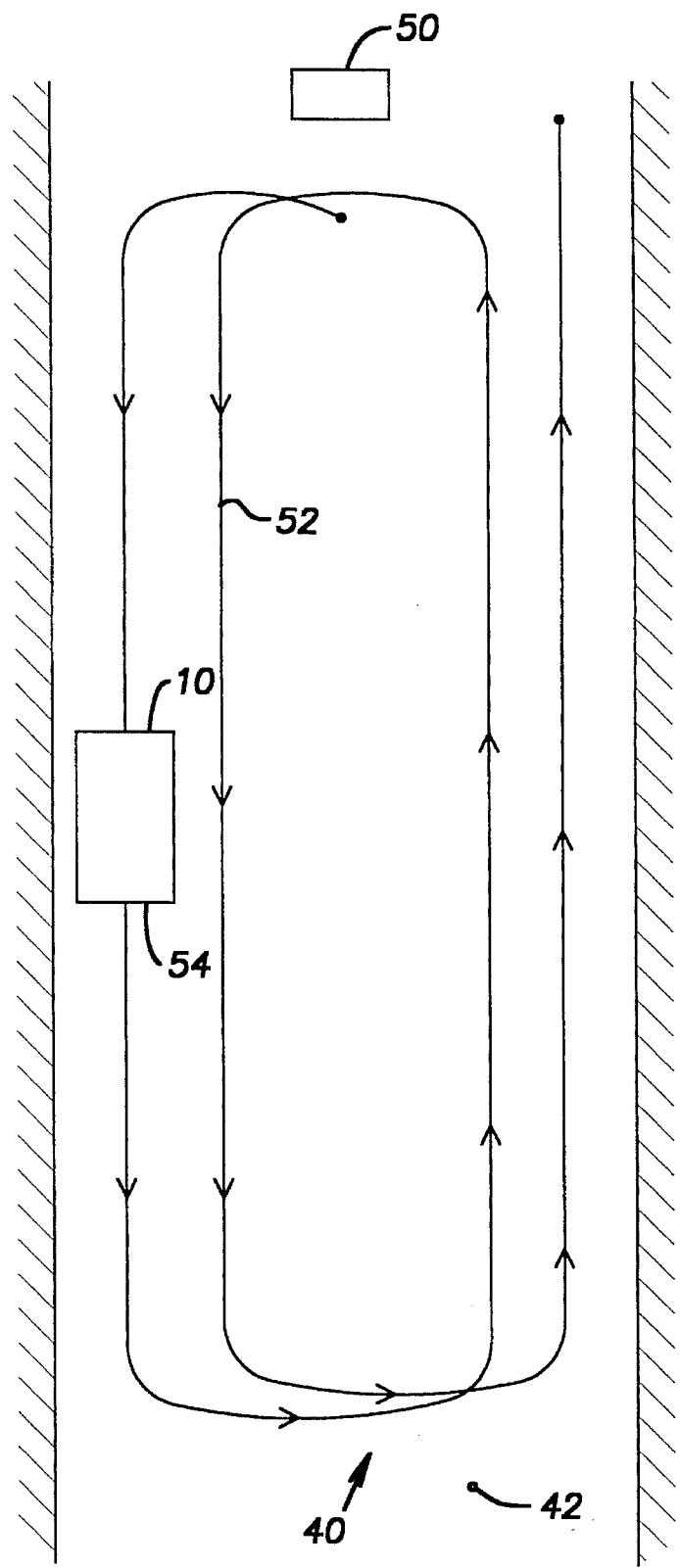
FIG. 3 is a plan view of the area of FIG. 2 showing an exemplary path of the robot during its cleaning phase.

Once the plan of the area 40 is determined, the robot 10 determines a path to completely traverse the area 40. For example, a zigzag path 52 such as shown in FIG. 3 may be calculated by the microprocessor 34 taking into account the dimensions of the area 40 and the cleaning width 54 of the robot 10.

The second phase is the cleaning phase. During this phase the robot 10 attempts to follow the path 52 it has determined.

To follow the path 52, the robot 10 navigates using the encoders 24, 26 and the sensors 28, 30, 32. The encoders 24, 26 provide dead-reckoning navigation, while the sensors 28, 30, 32 provide corrections to errors caused by, for example, slippage of the wheels 20, 22.

In addition, the sensors 28, 30, 32 can be advantageously used to follow variations in the boundaries of the area 40 that deviate from the dimensions measured in the learning phase and to avoid obstacles in the area 40.

Once the area 40 is cleaned, the robot 10 stops and waits for further directions from an operator.

Figure 4:
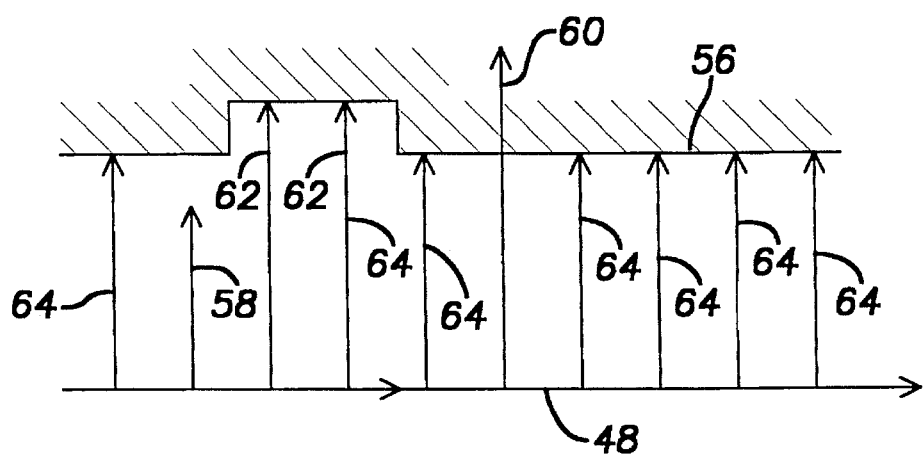
FIG. 4 is a graphical representation of boundary distance measurement according to the invention.

Referring to FIG. 4, a portion 56 of a left boundary is shown along with exemplary distances measured by the sensor 30.

Some measurements, such as short measurements 58 and long measurements 60, may be simply incorrect or, for example, caused by a person walking by, while other measurements 62 may represent variations in the boundary 56 such as doorways or alcoves.

The present invention deals with these errors and variations by using the mode of the measurements, that is, the value of the measurements that occurs most often. This results in the distance to the boundary 56 being taken as the mode distance 64.

Similarly, the right boundary measurements have a mode. The sum of the left and right modes plus the known distance between the distance sensors 28, 30 give the width of the area 40. This width and the length provided from the encoders 24, 26 determine the dimensions of the area 40.

Figure 5:
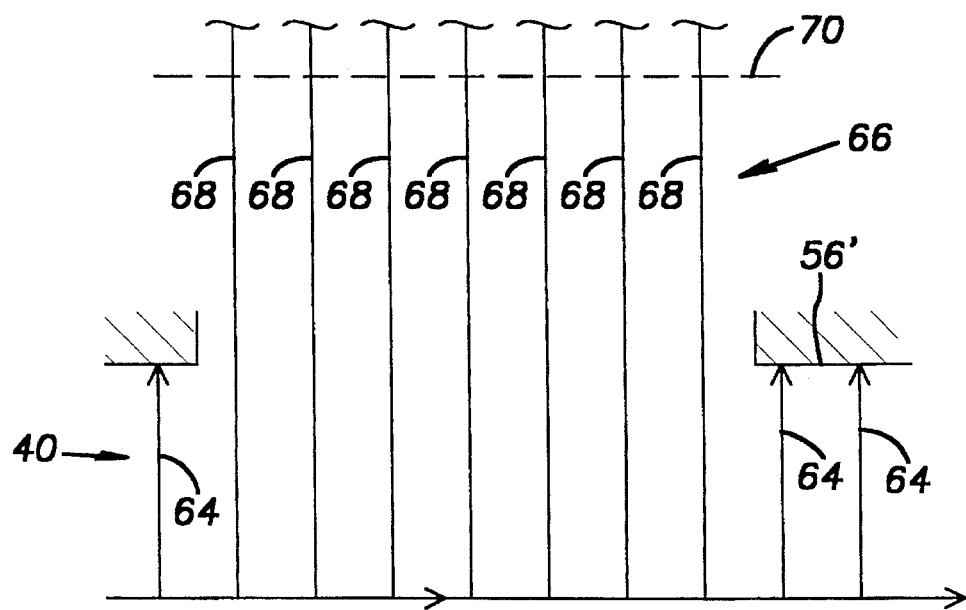
FIG. 5 is a graphical representation of an additional boundary distance measurement according to the invention.

Referring to FIG. 5, another portion 56' of a right boundary is shown with a large branching hallway 66. To prevent the hallway 66 from adversely affecting the measurement of the area 40, the robot 10 ignores measurements 68 that are greater than a maximum rage 70, for example, 5 meters. By disregarding distances greater than this maximum distance, a more accurate plan of the area 40 is created.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method for guiding a self-propelled autonomous cleaning robot having distance sensing means, obstacle sensing means, memory means and computing means, the method comprising:

a. starting a single-pass learning phase by said robot moving in a forward direction into an area to be cleaned having a left and right side boundary;

b. repeatedly contemporaneously sensing a distance to the right boundary, a distance to the left boundary, and a distance travelled;

c. storing said distances in said memory means;

d. adjusting the direction of said robot in response to said right and left boundary distances to maintain a desired distance from said left and right boundaries;

e. updating a plan of the area to be cleaned with said distances as the robot moves;

f. continuing steps b through e until an obstacle in the forward direction is detected by the robot, thereby ending said single-pass learning phase;

g. computing a cleaning path that will completely traverse said plan; and h. performing a cleaning phase by said robot following said cleaning path as sensed by said distance sensing means.

2. A method according to claim 1, wherein said plan of the area to be cleaned is determined in accordance with the mode of said right and left boundary distances.

3. A method according to claim 2, wherein said boundary distances with values greater than a maximum distance are disregarded.

4. A method according to claim 1, wherein said distance sensing means comprises sonar sensors.

5. A method according to claim 1, wherein said distance sensing means comprises infrared sensors.

6. A method according to claim 1, wherein said distance sensing means comprises shaft rotation encoding means.

* * * * *